United States Patent
Minakuchi et al.

(10) Patent No.: US 10,656,600 B2
(45) Date of Patent: May 19, 2020

(54) DRIVE DEVICE, ELECTRONIC WATCH, AND CONTROL METHOD OF DRIVE DEVICE

(71) Applicant: CASIO COMPUTER CO., LTD., Shibuya-ku, Tokyo (JP)

(72) Inventors: Mototaka Minakuchi, Fussa (JP); Noriyuki Kitta, Tokyo (JP)

(73) Assignee: CASIO COMPUTER CO., LTD., Tokyo (JP)

(*) Notice: Subject to any disclaimer, the term of this patent is extended or adjusted under 35 U.S.C. 154(b) by 101 days.

(21) Appl. No.: 15/806,888

(22) Filed: Nov. 8, 2017

(65) Prior Publication Data

US 2018/0067458 A1 Mar. 8, 2018

Related U.S. Application Data (62) Division of application No. 15/208,864, filed on Jul. 27, 2016, now Pat. No. 10,012,956.

(30) Foreign Application Priority Data

Sep. 11, 2015 (JP) ................... 2015-179218

(51) Int. Cl.
*G04C 3/14* (2006.01)
*H02P 8/14* (2006.01)

(52) U.S. Cl.
CPC ............... *G04C 3/14* (2013.01); *G04C 3/146* (2013.01); *H02P 8/14* (2013.01)

(58) Field of Classification Search
CPC .. G04C 3/14; G04C 3/146; H02P 8/14; H02P 8/40

USPC .......................................... 318/34
See application file for complete search history.

(56) References Cited

U.S. PATENT DOCUMENTS

| | | | |
|---|---|---|---|
| 4,072,888 A | 2/1978 | Bechtle et al. | |
| 4,126,821 A | 11/1978 | Cannon | |
| 4,445,785 A | 5/1984 | Chambon et al. | |
| 5,016,231 A | 5/1991 | Kawaguchi et al. | |
| 6,424,600 B1 | 7/2002 | Okeya et al. | |
| 6,541,935 B2 | 4/2003 | Takano | |
| 8,259,536 B2 | 9/2012 | Hasegawa et al. | |
| 8,750,079 B2* | 6/2014 | Lagorgette | G04B 19/02 368/220 |

(Continued)

FOREIGN PATENT DOCUMENTS

| | | |
|---|---|---|
| JP | H11289796 A | 10/1999 |
| JP | 2000235088 A | 8/2000 |

(Continued)

OTHER PUBLICATIONS

Extended European Search Report (EESR) dated Jan. 17, 2017, issued in counterpart European Application No. 16181815.8.

(Continued)

*Primary Examiner* — Edwin A. Leon
*Assistant Examiner* — Jason M Collins
(74) *Attorney, Agent, or Firm* — Holtz, Holtz & Volek PC (57) ABSTRACT

A drive device includes a plurality of motors; and a motor control processing unit that drives the motors. When the motor control processing unit drives the plurality of motors, it performs control such that a driving speed of one motor of the plurality of motors decreases and driving of the other motor of the plurality of motors starts.

5 Claims, 10 Drawing Sheets

(56) References Cited

U.S. PATENT DOCUMENTS

| | | |
|---|---|---|
| 2004/0179464 A1 | 9/2004 | Maruyama et al. |
| 2011/0063953 A1 | 3/2011 | Hasegawa et al. |
| 2014/0003201 A1 | 1/2014 | Sato |

FOREIGN PATENT DOCUMENTS

| | | |
|---|---|---|
| JP | 2004200918 A | 7/2004 |
| JP | 2004325316 A | 11/2004 |
| JP | 2005147727 A | 6/2005 |
| JP | 2009159772 A | 7/2009 |
| JP | 2010203831 A | 9/2010 |
| JP | 2010261905 A | 11/2010 |
| JP | 2011064469 A | 3/2011 |
| JP | 2011069621 A | 4/2011 |
| JP | 2012189340 A | 10/2012 |
| JP | 2013134189 A | 7/2013 |
| JP | 2013152096 A | 8/2013 |

OTHER PUBLICATIONS

Office Action (Non-Final Rejection) dated Jan. 2, 2018 issued in U.S. Appl. No. 15/220,864.

Japanese Office Action dated Jun. 18, 2019 (and English translation thereof) issued in counterpart Japanese Application No. 2015-179218.

Japanese Office Action dated Jan. 28, 2020 (and English translation thereof) issued in counterpart Japanese Application No. 2015-179218.

* cited by examiner

|  | MAXIMUM DRIVE FREQUENCY | DRIVE PULSE LENGTH |
|---|---|---|
| DUAL-CORE MOTOR | 192 pps | 3 ms |
| FIRST SINGLE-CORE MOTOR | 64 pps | 3.5 ms |
| SECOND SINGLE-CORE MOTOR | 64 pps | 3.5 ms |
| THIRD SINGLE-CORE MOTOR | 64 pps | 3.5 ms |

| HAND MOVEMENT RANGE | FIRST SINGLE-CORE MOTOR | THIRD SINGLE-CORE MOTOR | FOURTH SINGLE-CORE MOTOR |
|---|---|---|---|
| pt0 - pt1 | 64 pps | — | — |
| pt1 - pt2 | 64 pps | 64 pps | — |
| pt2 - pt3 | 32 pps | 32 pps | 32 pps |

DRIVE DEVICE, ELECTRONIC WATCH, AND CONTROL METHOD OF DRIVE DEVICE

CROSS-REFERENCE TO RELATED APPLICATIONS

This application is a Divisional Application of U.S. Ser. No. 15/220,864, filed on Jul. 27, 2016, which is based upon and claims the benefit of priority from the prior Japanese Patent Application No. 2015-179218, filed on Sep. 11, 2015, and the entire contents of both of which are incorporated herein by reference.

BACKGROUND OF THE INVENTION

The disclosure relates to a drive device for moving hands by stepping motors, an electronic watch having the drive device, and a control method of the drive device.

For example, in an analog electronic watch disclosed in JP-A-2005-147727, a plurality of stepping motors drives hands such as an hour hand, a minute hand, and a second hand, respectively, whereby time is displayed. This hand movement is performed by applying drive pulse voltages to the stepping motors, thereby rotating the rotors of the stepping motors, and transmitting the torque of each rotor to a corresponding hand at a predetermined gear ratio by gear train mechanisms which are arrangements of gears, thereby rotating the hands.

In the analog electronic watch, for example, during correction on current time or switching of display modes or operation states according to or a user's operation on a stem or the like, the output frequencies of the drive pulse voltages for the stepping motors are controlled, whereby the hands are fast-forwarded.

In the technology disclosed in JP-A-2005-147727, when the plurality of stepping motors is controlled, after a previous control motor stops, the operation of the next control motor is controlled.

In the technology of Japanese Patent Application Laid-Open No. 2005-147727, the degree of freedom of control on hand movement start timings and hand movement speeds is low, and it is difficult to express hand movement more smoothly and more dynamically.

SUMMARY OF THE INVENTION

An object of the disclosure is to provide an electronic watch having a high degree of freedom of hand movement and having improved expressiveness.

A drive device of the present invention comprises:
a first hand;
a second hand; and
a control unit that controls a movement operation of the second hand,
wherein the control unit starts movement of the second hand in a period after start of movement of the first hand before stop of the movement of the first hand, and
the control unit controls the movement operation of the second hand according to a decrease in a movement speed of the first hand.

A control method of a drive device having a plurality of motors and a motor control processing unit configured to control the motors, according to the present invention, comprising:

performing control, by the motor control processing unit, such that the driving speed of one motor of the plurality of motors decreases;
after decreasing the driving speed, performing control, by the motor control processing unit, such that driving of the other motor of the plurality of motors starts, by the motor control processing unit; and
after the start control, controlling a drive signal for the motor to start to be driven, by the motor control processing unit, such that the drive signal for the motor to start to be driven is at high level when a drive signal for the motor whose driving speed decreases is at low level.

DETAILED DESCRIPTION

Hereinafter, an embodiment of the present invention will be described in detail with reference to the accompanying drawings.

Figure 1:
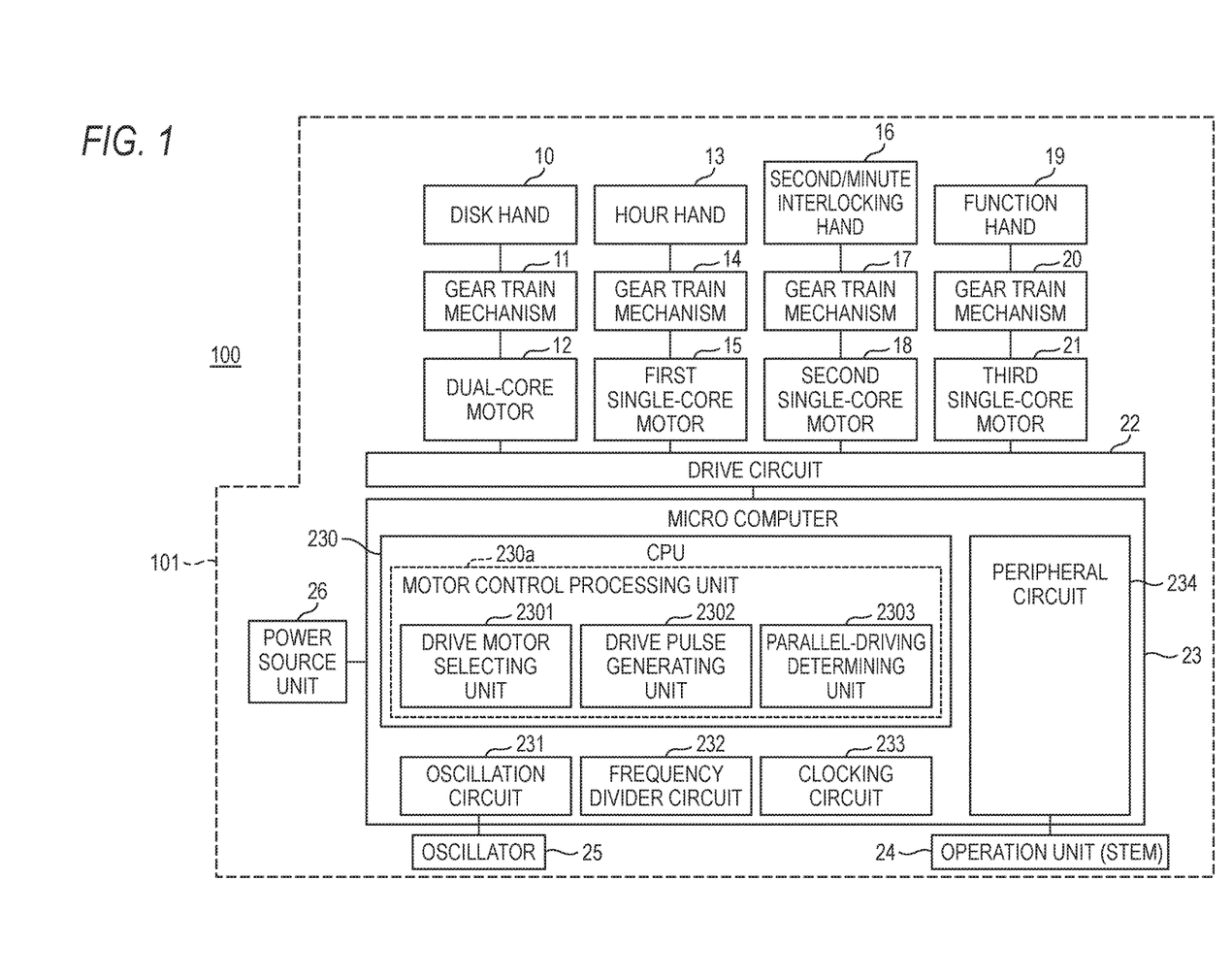
FIG. 1 is a block diagram illustrating the configuration of a drive device for an electronic watch of an embodiment.

FIG. 1 is a block diagram illustrating the configuration of a drive device 101 for a wristwatch type electronic watch according to the embodiment. Although the present embodiment will be described with reference to wristwatch type electronic watches, it is not limited thereto.

The drive device 101 of an electronic watch 100 of the embodiment includes a disk hand 10 which constitutes a calendar mechanism or the like of the watch, and other hands, that is, an hour hand 13, a second/minute interlocking hand 16, and a function hand 19, which rotate in steps of a predetermined angle on a dial. The disk hand 10 is driven through a gear train mechanism 11 by a dual-core motor 12. The hour hand 13 is driven through a gear train mechanism 14 by a first single-core motor 15. The second/minute interlocking hand 16 is driven through a gear train mechanism 17 by a second single-core motor 18. The function hand 19 is driven through a gear train mechanism 20 by a third single-core motor 21.

The dual-core motor 12, the first single-core motor 15, the second single-core motor 18, and the third single-core motor 21 (which will also be referred to collectively as motors) are stepping motors. A drive circuit 22 separately applies drive pulses to the motors, thereby rotating the motors. At this time, voltage can be applied to the dual-core motor 12 at a pulse frequency of 192 pps (Pulse Per Second) which is the maximum frequency, whereby it is possible to fast-forward the disk hand 10. Also, voltage can be applied to each of the first single-core motor 15, the second single-core motor 18, and the third single-core motor 21 at a pulse frequency of 64 pps which is the maximum frequency, whereby it is possible to separately fast-forward the hour hand 13, the second/minute interlocking hand 16, and the function hand 19.

The drive circuit 22 is controlled by a micro computer 23, and is composed of an H bridge circuit using metal-oxide-semiconductor field-effect transistors (MOS-FETs). In the above described way, the motors are rotated in a normal direction or a reverse direction.

The micro computer 23 includes a central processing unit (CPU) for performing arithmetic processing, and retains programs which the micro computer uses to configure a motor control processing unit 230a which is composed of a drive motor selecting unit 2301, a drive pulse generating unit 2302, and a parallel-driving determining unit 2303. Specifically, according to the operation mode, the drive motor selecting unit 2301 selects motors corresponding to hands to be moved. As will be described in detail, on the basis of the drive frequencies of the motors selected by the drive motor selecting unit 2301, the parallel-driving determining unit 2303 determines whether it is possible to drive the plurality of motors in parallel, and if parallel driving is possible, the parallel-driving determining unit 2303 instructs the drive pulse generating unit 2302 to generate drive pulses. For each of the motors, the drive pulse generating unit 2302 generates pulse voltage to be applied to the corresponding motor, for a predetermined time.

As described above, the micro computer 23 functions as a control unit for controlling movement of the hands.

An oscillator 25 is a crystal oscillator for obtaining a reference period of clocking and a periodic signal which is a reference of the operation clock of the micro computer 23. The oscillator 25 is driven by an oscillation circuit 231 included in the micro computer 23, and the frequency of the oscillator is appropriately divided by a frequency divider circuit 232, and a clocking circuit 233 clocks seconds, minutes, hours, and date.

An operation unit 24 is an operation unit such as a stem or a push button, and is connected to the frequency divider circuit 232 of the micro computer 23, and transmits operation information to the micro computer 23.

A power source unit 26 supplies electric power to the micro computer 23 and the motors such as the dual-core motor 12 and the like. The power source unit 26 is configured, for example, by combining a secondary battery and a solar panel.

Now, motor drive control during hand fast-forwarding of the electronic watch 100 of the present embodiment will be described.

Figure 2A:
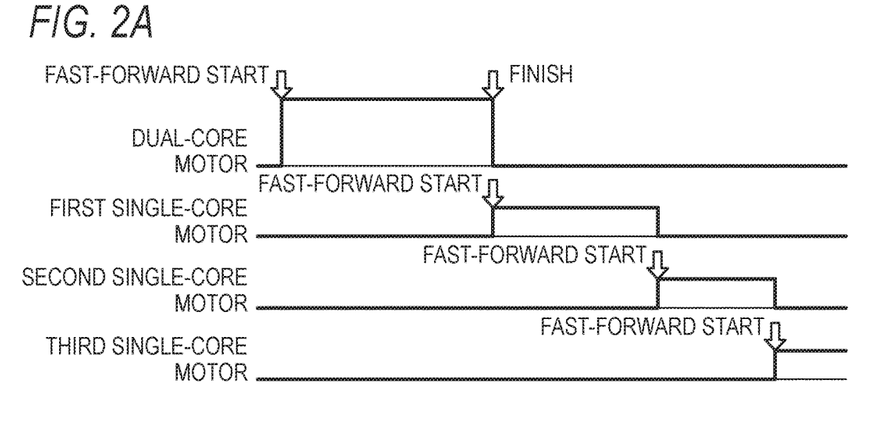
FIG. 2A is a view illustrating motor driving timings of an electronic watch of the related art.

FIG. 2A is a view illustrating motor driving timings of an electronic watch according to the related art. FIG. 2A shows the outlines of the waveforms of voltages which are applied to the dual-core motor 12, the first single-core motor 15, the second single-core motor 18, and the third single-core motor 21 shown in FIG. 1. In FIG. 2A, the transverse direction represents elapse of time. In the motor drive control of the related art, for example, after the dual-core motor 12 stops, a drive pulse is applied to the first single-core motor 15, thereby starting to drive the first single-core motor. In other words, after a specific motor stops, driving of another motor starts. Therefore, it takes long to move the hands, and expressiveness of movement of the hands is poor.

Figure 2B:
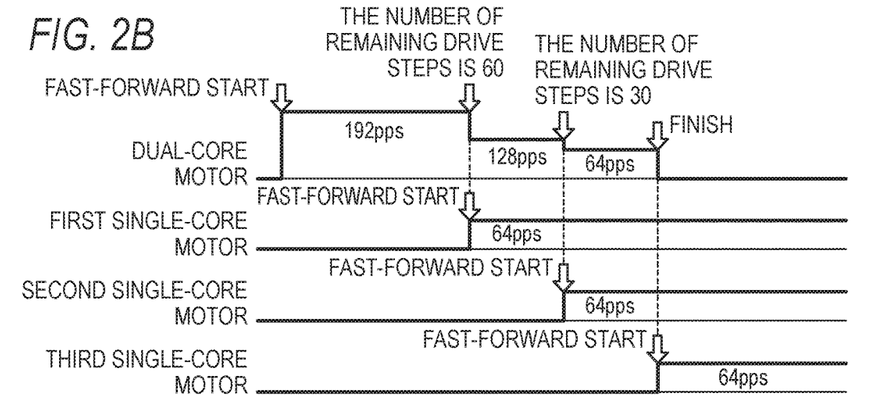
FIG. 2B is a view illustrating motor driving timings of the electronic watch of the embodiment.

For this reason, in the electronic watch 100 of the present embodiment, the hands are fast-forwarded at motor driving timings shown in FIG. 2B.

FIG. 2B shows the outlines of the waveforms of voltages which are applied to the dual-core motor 12, the first single-core motor 15, the second single-core motor 18, and the third single-core motor 21 shown in FIG. 1. In FIG. 2B, the transverse direction represents elapse of time.

According to the motor driving timings shown in FIG. 2B, after a specific motor is driven at the maximum frequency, the driving speed of the specific motor is gradually decreased, and as the driving speed of the specific motor is decreased, driving of the other motors starts. Therefore, hand movement time decreases, and movement of the hands is dynamically performed, whereby expressiveness of movement of the hands is improved.

Prior to a detailed description of the timings of FIG. 2B, the operation specifications of the dual-core motor 12, the first single-core motor 15, the second single-core motor 18, and the third single-core motor 21 during fast-forwarding will be described with reference to FIG. 3.

Figure 3:
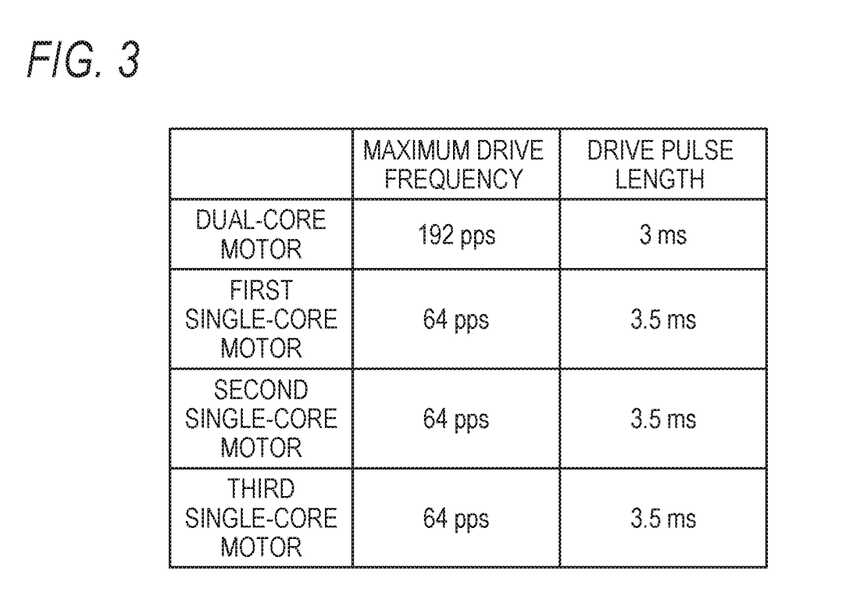
FIG. 3 is a view illustrating an overview of the specifications of motors of the embodiment.

FIG. 3 is a view illustrating the maximum drive frequencies and drive pulse lengths of drive pulses which are applied to the motors, respectively. As apparent from FIG. 3, in a case of driving the dual-core motor 12 at 192 pps, since a drive pulse of 3 ms are applied in each period of 5.2 ms, thereby driving the dual-core motor, it is impossible to drive the dual-core motor in parallel with any other motor. As shown in FIG. 3, in order to drive any other motor, it is required to apply drive pulses having a drive pulse length of 3.5 ms. If parallel driving is performed at 192 pps, in two motors, motor drive currents are generated at the same time. As a result, the drive current increases, whereby an excessive load is applied on the power source unit 26. For this reason, in the electronic watch 100 of the present embodiment, in a case where the drive pulses which are applied to the motors do not overlap each other, the motors are driven in parallel.

Specifically, in order to drive the dual-core motor 12 and the first single-core motor 15 in parallel, control is performed on a drive control signal for applying drive pulses to the dual-core motor 12 and a drive control signal for applying drive pulses to the first single-core motor 15, as follows. The drive pulse generating unit 2302 of the micro computer 23 disables the drive control signal of the dual-core motor 12 (for example, switching of the drive control signal to the low level), and then enables the drive control signal of the first single-core motor 15 (for example, switching of the drive control signal to the high level), or disables the drive control signal of the first single-core motor 15 and then enables the drive control signal of the dual-core motor 12.

According to the driving timings of FIG. 2B, first, drive pulses are applied to the dual-core motor 12 at the maximum drive frequency of 192 pps for a predetermined period, whereby the disk hand 10 is moved. If the number of remaining drive steps of the dual-core motor 12 becomes 60, the drive pulse rate of the dual-core motor 12 is decreased to 128 pps. At this time, the drive pulse period becomes 7.8 ms, and therefore it is possible to drive the first single-core motor 15 having the drive pulse length of 3.5 ms in parallel with the dual-core motor. Therefore, when the drive pulse rate of the dual-core motor 12 is decreased to 128 pps, the first single-core motor 15 is driven at 64 pps, in parallel with driving of the dual-core motor, thereby starting fast-forwarding.

Thereafter, if the number of remaining drive steps of the dual-core motor 12 becomes 30, the drive pulse rate of the dual-core motor 12 is decreased to 64 pps. At this time, the drive pulse period becomes 15.6 ms, and therefore it is possible to drive the first single-core motor 15 and the second single-core motor 18 having the drive pulse lengths of 3.5 ms in parallel with driving of the dual-core motor. Therefore, when the drive pulse rate of the dual-core motor 12 is decreased to 64 pps, in addition to the first single-core motor 15, the second single-core motor 18 is driven at 64 pps, in parallel with driving of the dual-core motor, thereby starting fast-forwarding.

When driving of the dual-core motor 12 finishes, the first single-core motor 15 and the second single-core motor 18 are being driven at 64 pps, and the drive pulse period at this moment is 15.6 ms. Since the drive pulse lengths of the first single-core motor 15 and the second single-core motor 18 are 3.5 ms, it is possible to further drive the third single-core motor 21 in parallel with driving of the first and second single-core motors. Therefore, when driving of the dual-core motor 12 finishes, in parallel with driving of the first single-core motor 15 and the second single-core motor 18, the third single-core motor 21 is driven at 64 pps, and fast-forwarding of the third single-core motor 21 starts.

As described above, after the dual-core motor 12 is driven at the maximum frequency, and then the driving speed is gradually decreased, and as the driving speed of the dual-core motor 12 is decreased, driving of the first single-core motor 15, the second single-core motor 18, and the third single-core motor 21 sequentially starts.

Figure 2C:
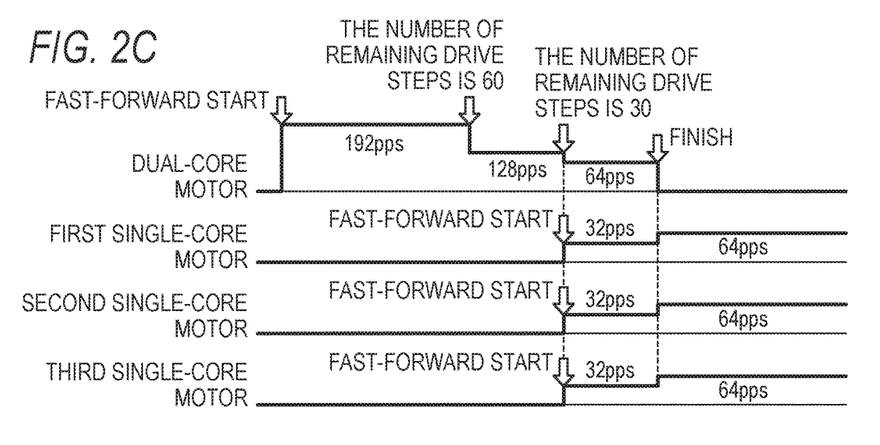
FIG. 2C is a view illustrating other motor driving timings of the electronic watch of the embodiment.

FIG. 2C is a view illustrating an example in which the electronic watch 100 of the present embodiment performs fast-forwarding of the hands at other motor driving timings. In the example of FIG. 2C, as the driving speed of the dual-core motor 12 decreases, parallel driving of the first single-core motor 15, the second single-core motor 18, and the third single-core motor 21 starts.

The dual-core motor 12 is driven at the maximum drive frequency of 192 pps, thereby starting fast-forwarding of the hand. This driving is performed for a predetermined period, and if the number of remaining drive steps becomes 60, the drive frequency of the dual-core motor 12 is decreased to 128 pps. At this time, it is determined whether it is possible to further drive the first single-core motor 15, the second single-core motor 18, and the third single-core motor 21 in parallel with driving of the dual-core motor. This determination is performed on the basis of whether the drive period of the dual-core motor 12 is longer than the sum of the drive pulse lengths of the individual motors to be driven in parallel. Specifically, since the drive period of the dual-core motor 12 is 7.8 ms, and the sum of the drive pulse lengths of the individual motors to be driven in parallel is 13.5 ms, parallel driving is not possible. Therefore, only the dual-core motor 12 is driven at 128 pps for a predetermined period.

If the number of remaining drive steps of the dual-core motor 12 is 30, the drive pulse frequency of the dual-core motor 12 is decreased to 64 pps. At this time, since the drive period of the dual-core motor 12 becomes 15.6 ms is longer than the sum of the drive pulse lengths of the individual motors to be driven in parallel, parallel driving becomes possible. Therefore, the first single-core motor 15, the second single-core motor 18, and the third single-core motor 21 are driven at a frequency of 32 pps in parallel with the dual-core motor, thereby starting to fast-forward.

When driving of the dual-core motor 12 finishes, the drive pulse rates of the first single-core motor 15, the second single-core motor 18, and the third single-core motor 21 are increased to 64 pps. At this time, since the drive period becomes 15.6 ms longer than the sum of the drive pulse lengths of the first single-core motor 15, the second single-core motor 18, and the third single-core motor 21, parallel driving is possible.

As a result of this control, it is possible to perform movement of the hands in a fade-out/fade-in manner in which increasing of the movement speeds of the hour hand 13, the second/minute interlocking hand 16, and the function hand 19 is interlocked with decreasing in the movement speed of the disk hand 10.

As described above, in the motor drive control of the electronic watch 100 of the present embodiment, when the drive frequency of the dual-core motor decreases, if the drive period of the dual-core motor 12 is longer than the sum of the drive pulse length of the dual-core motor 12 and the drive pulse lengths of the motors to be sequentially or simultaneously driven in parallel, parallel driving is performed.

In the above description, as the driving speed of the dual-core motor 12 decreases, the other motors are driven in parallel. However, other motor combinations are possible.

Figure 4:
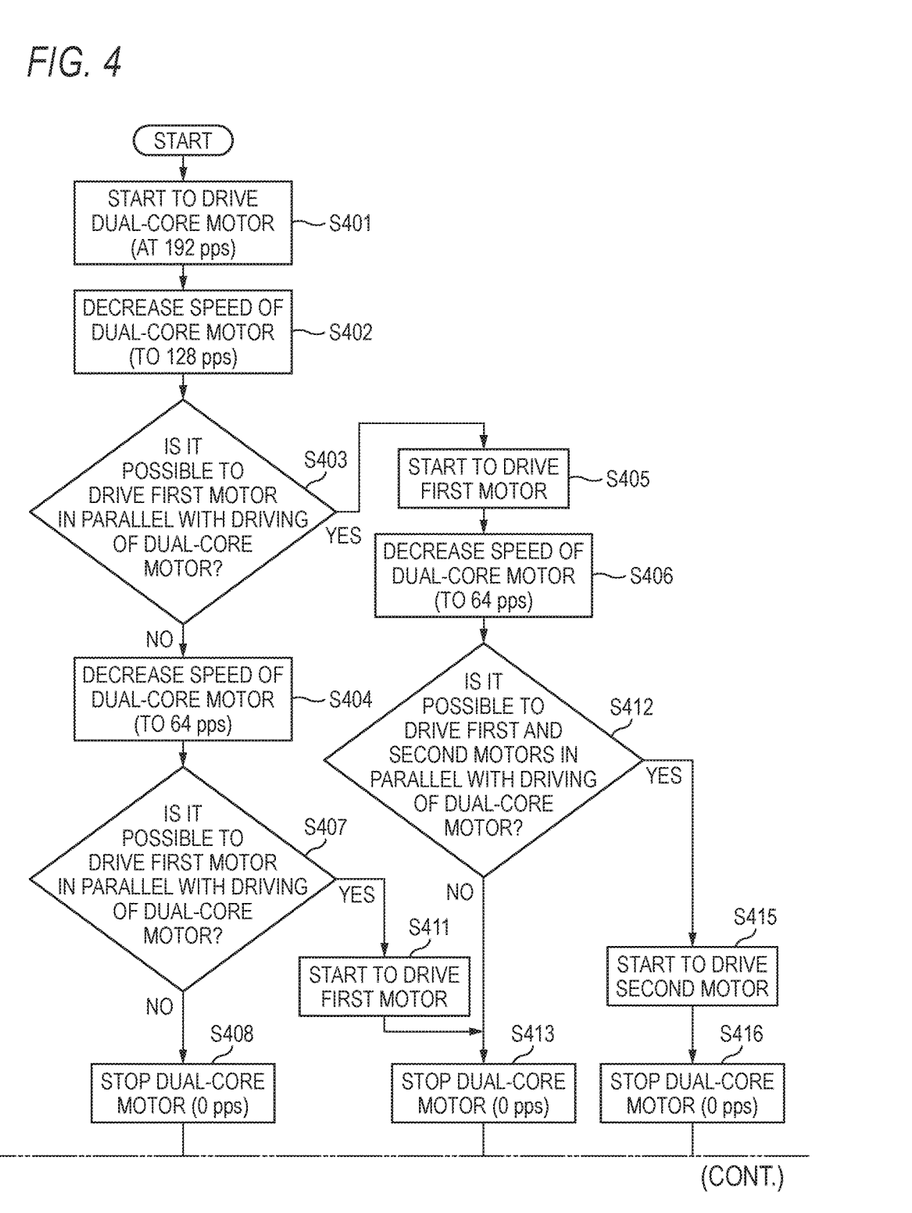
FIG. 4 is a view illustrating a motor control flow of the embodiment.

Now, the flow of control at the driving timings of FIG. 2B will be described with reference to FIG. 4.

First, in STEP S401, the dual-core motor 12 starts to be driven at 192 pps. After driving is performed for a predetermined period, in STEP S402, the driving speed of the dual-core motor 12 is decreased to 128 pps. Further, in STEP S403, it is determined whether it is possible to drive the first single-core motor 15 (referred to as "FIRST MOTOR" in FIG. 4) and the dual-core motor 12 in parallel. As described above, this determination is performed on the basis of whether the drive period of the dual-core motor 12 is longer than the sum of the drive pulse length of the dual-core motor 12 and the drive pulse length of the first single-core motor 15.

In STEP S403, in a case where that the drive period of the dual-core motor 12 is not longer than the sum of the drive pulse lengths of the motors, it is determined that parallel driving is impossible ("No" in STEP S403), and the flow proceeds to STEP S404.

Meanwhile, in STEP S403, in a case where the drive period of the dual-core motor 12 is longer than the sum of the drive pulse lengths of the motors, it is determined that parallel driving is possible ("Yes" in STEP S403), and the flow proceeds to STEP S405.

In STEP S405, the first single-core motor 15 is driven at 64 pps, thereby starting fast-forwarding. Then, after driving is performed for a predetermined period, in STEP S406, the driving speed of the dual-core motor 12 is decreased to 64 pps.

At this time, in STEP S412, it is determined whether parallel driving of the first single-core motor 15, the single-core motor 18 (referred to as "SECOND MOTOR" in FIG. 4), and the dual-core motor 12 is possible. This determination is performed on the basis of whether the drive period of the dual-core motor 12 is longer than the sum of the drive pulse lengths of the motors to be driven in parallel.

In STEP S412, in a case where that the drive period of the dual-core motor 12 is not longer than the sum of the drive pulse lengths of the motors, it is determined that parallel driving is impossible ("No" in STEP S412), and the flow proceeds to STEP S413.

Meanwhile, in STEP S412, in a case where the drive period of the dual-core motor 12 is longer than the sum of the drive pulse lengths of the motors, it is determined that it is possible to further drive the first single-core motor 15 and the second single-core motor 18 in parallel with driving of the dual-core motor ("Yes" in STEP S412), and the flow proceeds to STEP S415.

In STEP S415, the second single-core motor 18 is driven at 64 pps, thereby starting fast-forwarding. Then, after driving is performed for a predetermined period, in STEP S416, driving of the dual-core motor 12 is stopped.

Then, in STEP S417, the third single-core motor 21 (referred to as "THIRD MOTOR" in FIG. 4) is driven at 64 pps, thereby performing hand fast-forwarding based on parallel driving.

Then, after driving is performed for a predetermined period, in STEP S410, driving of the first single-core motor 15, the second single-core motor 18, and the third single-core motor 21 is stopped.

In STEP S404, the dual-core motor 12 is driven at 128 pps for a predetermined period, and then the driving speed of the dual-core motor 12 is decreased to 64 pps.

Then, in STEP S407, it is determined whether it is possible to drive the first single-core motor 15 and the dual-core motor 12 in parallel. As described above, this determination is performed on the basis of whether the drive period of the dual-core motor 12 is longer than the sum of the drive pulse length of the dual-core motor 12 and the drive pulse length of the first single-core motor 15.

In STEP S407, in a case where that the drive period of the dual-core motor 12 is not longer than the sum of the drive pulse lengths of the motors, it is determined that parallel driving is impossible ("No" in STEP S407), and the flow proceeds to STEP S408.

Meanwhile, in STEP S407, in a case where the drive period of the dual-core motor 12 is longer than the sum of the drive pulse lengths of the motors, it is determined that parallel driving of the dual-core motor and the first single-core motor 15 is possible ("Yes" in STEP S407), and the flow proceeds to STEP S411.

In STEP S408, the dual-core motor 12 is driven at 64 pps for a predetermined period, and then driving of the dual-core motor 12 is stopped. Then, in STEP S409, parallel driving of the first single-core motor 15, the second single-core motor 18, and the third single-core motor 21 is started. Then, after a predetermined period, in STEP S410, driving is stopped.

In STEP S411, parallel driving of the first single-core motor 15 and the dual-core motor is started. Then, the flow proceeds to STEP S413.

In STEP S413, driving is performed for a predetermined period, and then driving of the dual-core motor 12 is stopped while driving of the first single-core motor 15 is kept.

Then, in STEP S414, driving of the second single-core motor 18 and the third single-core motor 21 is started, thereby performing hand fast-forwarding based on parallel driving.

Then, after driving is performed for a predetermined period, in STEP S410, driving of the first single-core motor 15, the second single-core motor 18, and the third single-core motor 21 is stopped.

Then, the flow of control at the driving timings of FIG. 2B finishes.

Now, a more specific example of hand movement control of another electronic watch 110 of the embodiment will be described.

Figure 5:
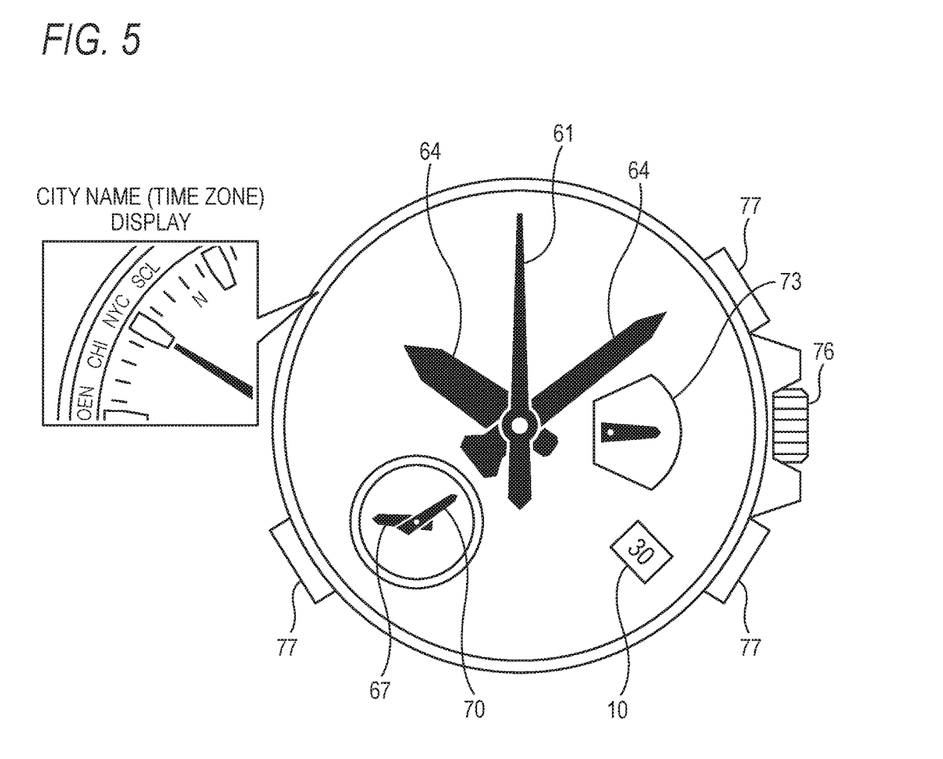
FIG. 5 is a view illustrating the dial of another electronic watch of the embodiment.

FIG. 5 is a view illustrating the dial of the electronic watch 110. The electronic watch 110 has various hands such as a main-watch second hand 61, a main-watch hour/minute interlocking hand 64, a sub-watch hour hand 67 which is a 24-hour hand, a sub-watch minute hand 70, a function hand 73, and a disk hand 10, and has a stem 76 and a plurality of buttons 77.

Figure 6:
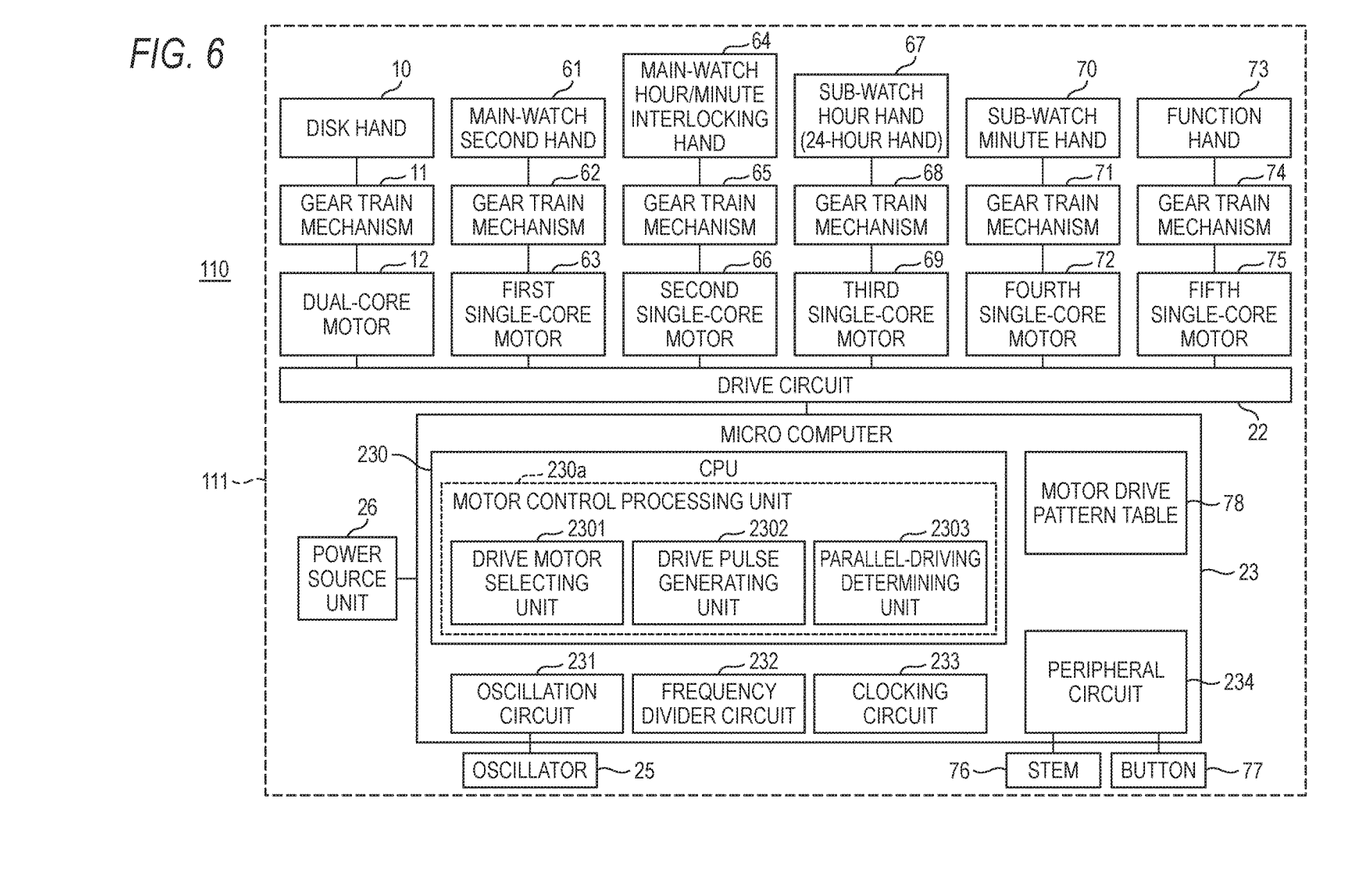
FIG. 6 is a block diagram illustrating the configuration of a drive device of the electronic watch of FIG. 5.

FIG. 6 is a block diagram illustrating the configuration of a drive device 111 of the electronic watch 110 shown in FIG. 5.

The disk hand 10 is driven through a gear train mechanism 11 by a dual-core motor 12. The main-watch second hand 61 is driven through a gear train mechanism 62 by a first single-core motor 63. The main-watch hour/minute interlocking hand 64 is driven through a gear train mechanism 65 by a second single-core motor 66. The sub-watch hour hand 67 is driven through a gear train mechanism 68 by a third single-core motor 69. The sub-watch minute hand 70 is driven through a gear train mechanism 71 by a fourth single-core motor 72. The function hand 73 is driven through a gear train mechanism 74 by a fifth single-core motor 75.

The dual-core motor 12, the first single-core motor 63, the second single-core motor 66, the third single-core motor 69, the fourth single-core motor 72, and the fifth single-core motor 75 are stepping motors. A drive circuit 22 separately applies drive pulses to the motors, thereby rotating the motors.

The drive circuit 22 is controlled by a micro computer 23, and has more drive channels than the drive circuit 22 of FIG. 1 has. The micro computer 23 also has the same configuration as that of FIG. 1 except that it has a motor drive pattern table 78 to be described below in detail.

Now, hand movement control during a reset operation of a stopwatch function of the electronic watch 110 will be described.

In the stopwatch function of the electronic watch 110, minute of elapsed time is indicated by the sub-watch hour hand 67, and second of elapsed time is indicated by the sub-watch minute hand 70. Further, elapsed time is clocked in units of 1/20 seconds by the main-watch hour/minute interlocking hand 64. When stopwatch function starts to operate, or when a reset button 77 is pushed for clocking, the main-watch hour/minute interlocking hand 64, the sub-watch hour hand 67, and the sub-watch minute hand 70 are fast-forwarded to the zero position of clocking.

In order to implement high expressiveness of hand movement, the electronic watch 110 of the present embodiment performs hand movement control under the following conditions.

A condition that three hands of the main-watch hour/minute interlocking hand 64, the sub-watch hour hand 67, and the sub-watch minute hand 70 should be able to be moved in parallel so as to reach the zero position almost at the same time.

A condition that hand movement time should be short.

A condition that the main-watch hour/minute interlocking hand 64, the sub-watch hour hand 67, and the sub-watch minute hand 70 should be able to rotate in a normal direction and a reverse direction.

A condition that the maximum drive frequencies of the main-watch hour/minute interlocking hand 64, the sub-watch hour hand 67, and the sub-watch minute hand 70 should be 64 pps, and the drive pulse lengths thereof should be 6.0 ms.

As will be described in more detail with reference to FIGS. 7 to 9, the electronic watch 110 obtains the order of the hands in terms of the number of remaining steps for hand movement to the zero position, and start to fast-forward a hand having the greatest number of remaining steps, first. Thereafter, in order to start to drive the other hands, the electronic watch determines whether parallel driving is possible. In a case where parallel driving is not possible, the electronic device decreases the drive frequency of the driven hand, and performs parallel driving of the hands, thereby fast-forwarding three hands such that the hands reach the zero position almost at the same time.

Figure 7:
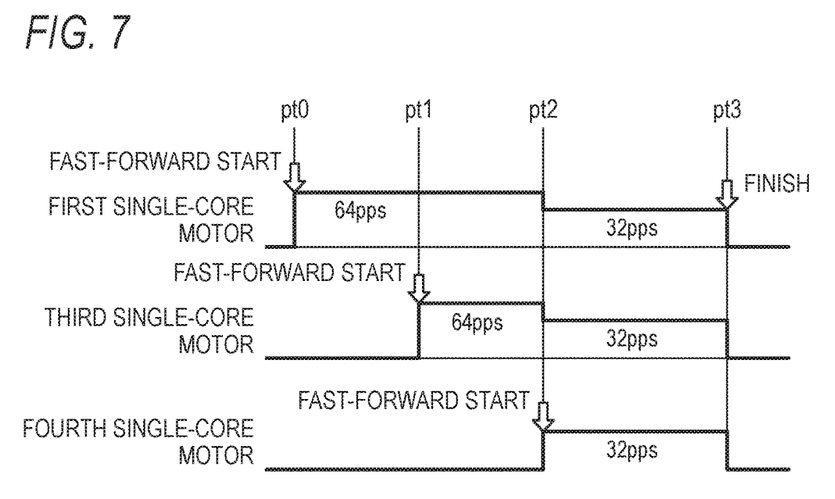
FIG. 7 is a timing chart for explaining a reset operation of a stopwatch function.

FIG. 7 is a timing chart for explaining the reset operation of the stopwatch function. FIG. 7 shows a case where the number of remaining steps for hand movement to the zero position increases in the order the main-watch hour/minute interlocking hand 64 (the first single-core motor), the sub-watch hour hand 67 (the third single-core motor), and the sub-watch minute hand 70 (the fourth single-core motor).

First, at a timing pt0, the first single-core motor is driven at 64 pps, whereby starting fast-forwarding.

At a timing pt1 which is the driving start timing of the third single-core motor, it is determined whether parallel driving of the first single-core motor and the third single-core motor is possible. This determination is performed on the basis of whether the drive period of the first single-core motor is longer than the sum of the drive pulse length of the first single-core motor and the drive pulse length of the third single-core motor. In this case, since the drive period is 15.6 ms, and the sum of the drive pulse lengths is 12.0 ms, it is determined that parallel driving of the first single-core motor and the third single-core motor is possible. Therefore, at the timing pt1, the third single-core motor is driven at 64 pps, whereby starting fast-forwarding.

At a timing pt2 which is the driving start timing of the fourth single-core motor, it is determined whether parallel driving of the first single-core motor, the third single-core motor, and the fourth single-core motor is possible. In this case, since parallel driving of three hands at 64 pps is not possible, the drive frequencies of the motors are decreased to 32 pps, and it is determined again whether parallel driving is possible. In this case, since the drive period 31.2 ms, and the sum of the drive pulse lengths is 18.0 ms, it is determined that parallel driving of the first single-core motor, the third single-core motor, and the fourth single-core motor is possible. Therefore, at the timing pt2, the first single-core motor and the third single-core motor are decelerated to 32 pps, and the fourth single-core motor is driven at 33 pps, thereby starting fast-forwarding.

In this hand driving timing control, since the numbers of remaining steps for hand movement to the zero position are obtained in advance, and then fast-forwarding of each of the hands is started, if driving of the first single-core motor, the third single-core motor, and the fourth single-core motor is stopped at a timing pt3, the main-watch hour/minute interlocking hand 64, the sub-watch hour hand 67, and the sub-watch minute hand 70 reach the zero position almost at the same time.

Figure 8:
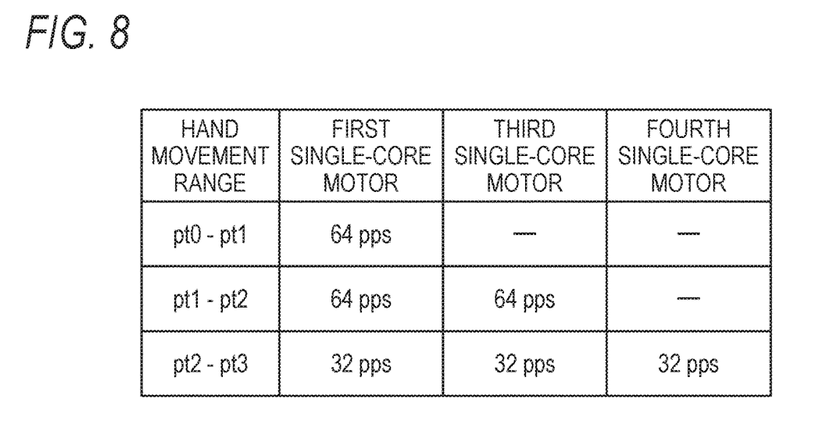
FIG. 8 is a view illustrating operation conditions of motors during the reset operation.

FIG. 8 is a view illustrating the operation conditions of the motors during the reset operation, and shows the drive frequencies in the hand movement ranges of the first single-core motor, the third single-core motor, and the fourth single-core motor described with reference to FIG. 7.

In the hand reset operation, the fast-forward start positions and the zero position are determined before the hands are moved. Therefore, it is possible to obtain the operation conditions of FIG. 8 before driving of the motors, and it is also possible to fast-forward the hands to the zero position by driving the motors according to those operation conditions.

Figure 9:
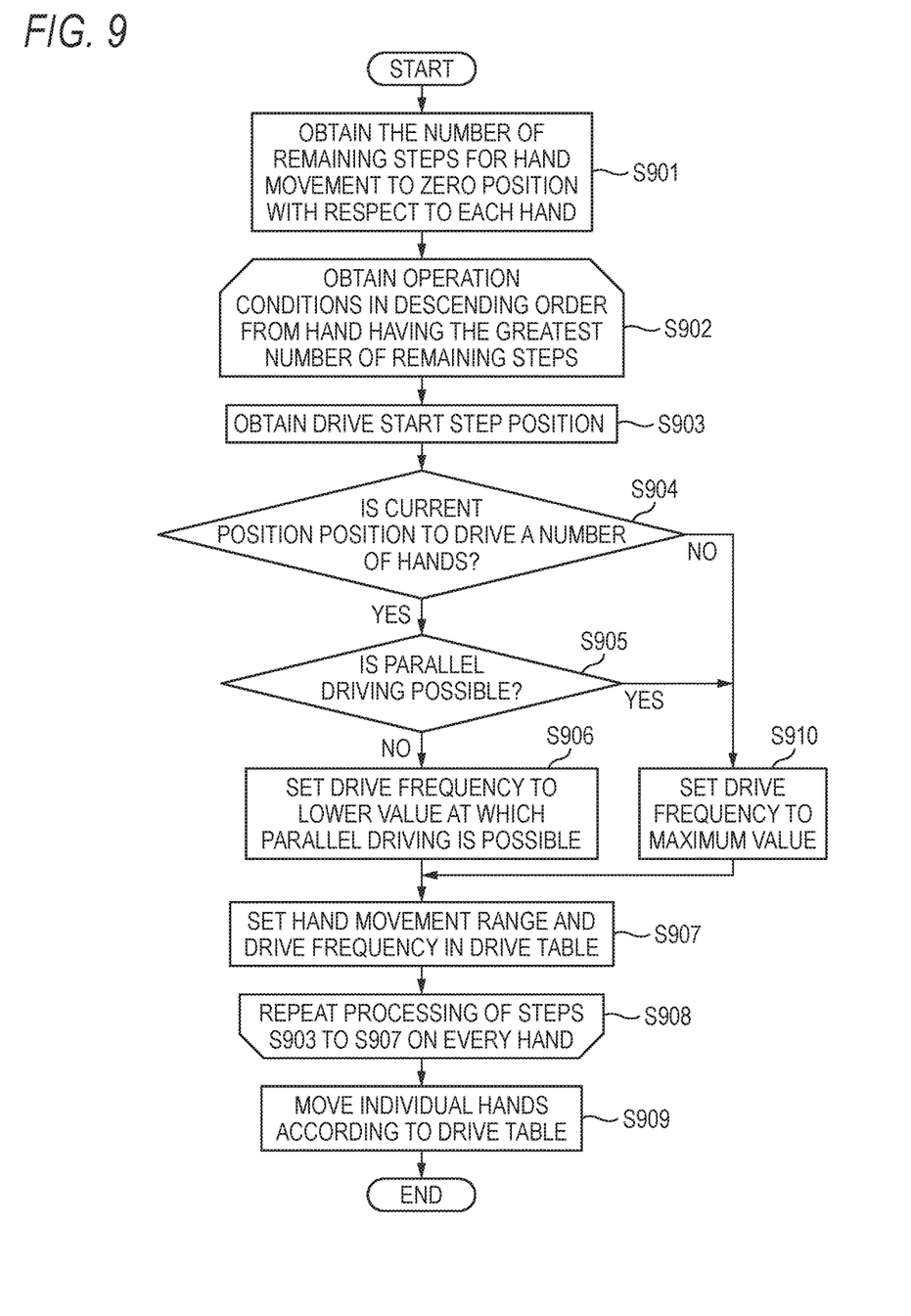
FIG. 9 is a view illustrating the flow of control on the motors during the reset operation.

FIG. 9 is a view illustrating the flow of control for obtaining the operation conditions shown in FIG. 8 and performing motor drive control.

First, in STEP S901, with respect to each of the hands, the number of remaining steps for hand movement to the zero position is obtained.

Subsequently, in STEP S902, processing to STEP S908 is repeated on the hands in descending order from the hand having the greatest number of remaining steps, whereby the operation conditions of the motors are obtained.

In STEP S903, the drive start step position of the corresponding hand is obtained.

Subsequently, in STEP S904, it is determined whether the current position is a step position to drive a plurality of hands (a number of hands). If the current position is not a step position to drive a plurality of hands ("No" in STEP S904), in STEP S910, the drive frequency of the hand is set to the maximum frequency. Then, the flow proceeds to STEP S907. Meanwhile, if the current position is a step position to drive a plurality of hands ("Yes" in STEP S904), in STEP S905, it is determined whether parallel driving is possible.

If it is determined in STEP S905 that parallel driving is possible ("Yes" in STEP S905, in STEP S910, the drive frequency of the hand is set to the maximum frequency. Then, the flow proceeds to STEP S907. Meanwhile, if it is determined that parallel driving is not possible ("No" in STEP S905), the drive frequency of the hand is set to a lower frequency at which parallel driving is possible. Then, the flow proceeds to STEP S907.

In STEP S907, the hand movement range and the drive frequency are set in a drive table (the motor drive pattern table 78 of FIG. 6).

Subsequently, in STEP S908, processing of STEPS S903 to S907 is repeated on the other hands.

Next, in STEP S909, the motors are driven according to the drive table, whereby the hands are moved.

In this flow, it is possible to perform the hand movement of the reset operation of the stopwatch function of the electronic watch 110 described with reference to FIG. 7.

The hand movement control during the reset operation of the stopwatch function of the electronic watch 110 described with reference to FIGS. 7 to 9 can also be applied to a flyback operation of the stopwatch function.

Figure 10:
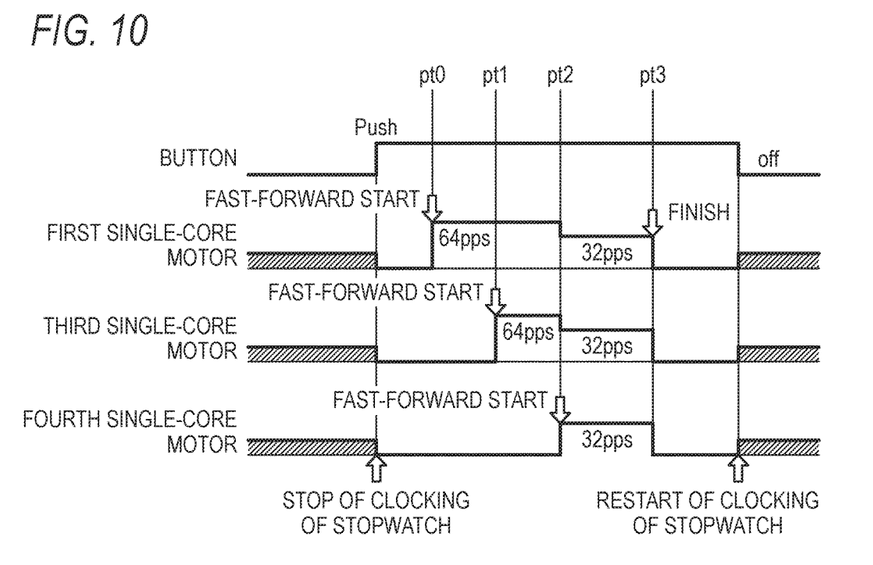
FIG. 10 is a timing chart for explaining operations of a flyback function of a stopwatch.
Figure 11:
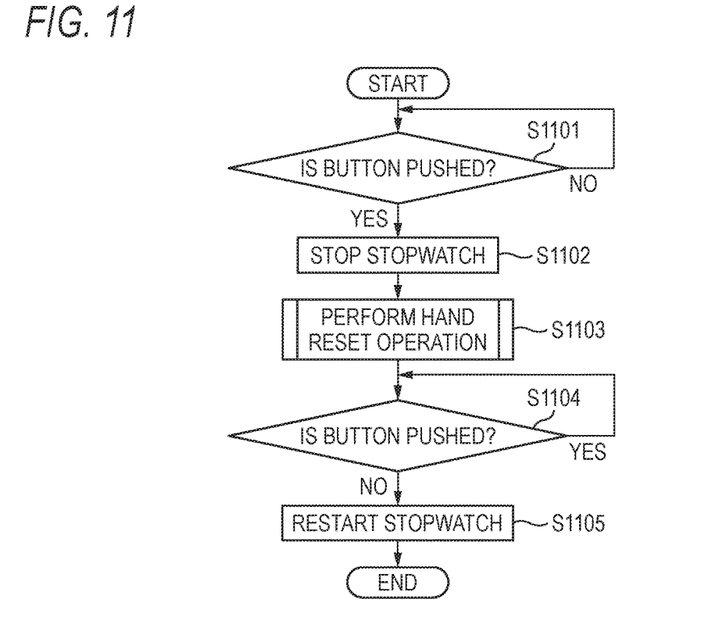
FIG. 11 is a view illustrating the control flow of the flyback function of the stopwatch.

FIG. 10 is a timing chart for explaining the operation of the flyback function of a stopwatch, and FIG. 11 is a view illustrating the flow of control of the flyback function of the stopwatch.

As shown in FIG. 10, if a button 77 of the electronic watch 110 is pushed ("Push"), driving of the first single-core motor, the third single-core motor, and the fourth single-core motor stops, whereby clocking of the stopwatch stops. Thereafter, movement of the main-watch hour/minute interlocking hand 64, the sub-watch hour hand 67, and the sub-watch minute hand 70 to the zero position described with reference to FIG. 7 is performed (the reset operation). After resetting of the hands finishes, if the button 77 is released ("off"), clocking of the stopwatch restarts.

Now, the control flow of the flyback function of FIG. 11 will be described.

First, in STEP S1101, it is waited for the button 77 of the electronic watch 110 to be pushed.

If it is determined in STEP S1101 that the button 77 is pushed ("Yes" in STEP S1101), in STEP S1102, clocking of the stopwatch is stopped.

Subsequently, in STEP S1103, processing of the hand reset operation described with reference to FIG. 9 is performed.

If the hand reset operation finishes, in STEP S1104, it is waited for the button 77 to be released.

If the button 77 is released ("No" in STEP S1104), in STEP S1105, clocking of the stopwatch is restarted.

By the above described processing, it is possible to perform the flyback operation of the stopwatch function.

Although the embodiment has been described with reference to the electronic watches having analog hands, the embodiment is not limited thereto, and can also be applied to any other clocking device which performs display by analog hands.

What is claimed is:

1. A drive device comprising:

a plurality of motors; and a motor control processing unit that drives the plurality of motors, wherein the motor control processing unit makes a determination as to whether a first drive period of a first motor of the plurality of motors is longer than a sum of a drive pulse length of the first motor and a drive pulse length of a second motor of the plurality of motors, wherein the motor control processing unit drives the first motor based on the first drive period when driving the first motor and the second motor in parallel, in a case in which the motor control processing unit determines that the first drive period of the first motor is longer than the sum of the drive pulse length of the first motor and the drive pulse length of the second motor, and wherein the motor control processing unit drives the first motor based on a second drive period that is longer than the first drive period when driving the first motor and the second motor in parallel, in a case in which the motor control processing unit determines that the first drive period of the first motor is not longer than the sum of the drive pulse length of the first motor and the drive pulse length of the second motor.

2. The drive device according to claim 1, wherein:

the motor control processing unit controls a drive signal for the second motor to start to be driven such that the drive signal for the second motor to start to be driven is at its maximum level when a drive signal for the first motor whose driving speed decreases is at a level lower than its maximum level.

3. The drive device according to claim 1, wherein:

the motor control processing unit generates a drive signal of the second motor to start to be driven in parallel with the first motor, according to a result of the determination.

4. A control method of a drive device having a plurality of motors and a motor control processing unit configured to control the plurality of motors, the control method comprising:

performing start control by the motor control processing unit such that, in accordance with a decrease in a driving speed of a first motor of the plurality of motors, driving of a second motor of the plurality of motors starts and the second motor is driven in parallel with the first motor, wherein in performing the start control, the motor control processing unit (i) determines whether a first drive period of the first motor is longer than a sum of a drive pulse length of the first motor and a drive pulse length of the second motor, and (ii) in response to a determination that the first drive period is longer than the sum of the drive pulse length of the first motor and the drive pulse length of the second motor, controls a drive signal for the second motor to start to be driven such that the drive signal for the second motor to start to be driven is at its maximum level when a drive signal for the first motor whose driving speed decreases is at a level lower than its maximum level.

5. A control method of a drive device having a plurality of motors and a motor control processing unit configured to control the plurality of motors, the control method comprising:

determining whether a first drive period of a first motor of the plurality of motors is longer than a sum of a drive pulse length of the first motor and a drive pulse length of a second motor of the plurality of motors;

driving the first motor based on the first drive period when driving the first motor and the second motor in parallel, in a case in which it is determined that the first drive period of the first motor is longer than the sum of the drive pulse length of the first motor and the drive pulse length of the second motor; and driving the first motor based on a second drive period that is longer than the first drive period when driving the first motor and the second motor in parallel, in a case in which it is determined that the first drive period of the first motor is not longer than the sum of the drive pulse length of the first motor and the drive pulse length of the second motor.

* * * * *

UNITED STATES PATENT AND TRADEMARK OFFICE
CERTIFICATE OF CORRECTION

Page 1 of 1

PATENT NO. : 10,656,600 B2
APPLICATION NO. : 15/806888
DATED : May 19, 2020
INVENTOR(S) : Minakuchi et al.

It is certified that error appears in the above-identified patent and that said Letters Patent is hereby corrected as shown below:

On the Title Page

Item (62) under "Related U.S. Application Data," delete "15/208,864" and insert --15/220,864--.

Signed and Sealed this
Sixth Day of October, 2020

Andrei Iancu
*Director of the United States Patent and Trademark Office*